A. L. PUTNAM.
METALLIC WHEEL.
APPLICATION FILED AUG. 23, 1915.
1,266,155.
Patented May 14, 1918.
2 SHEETS—SHEET 1.
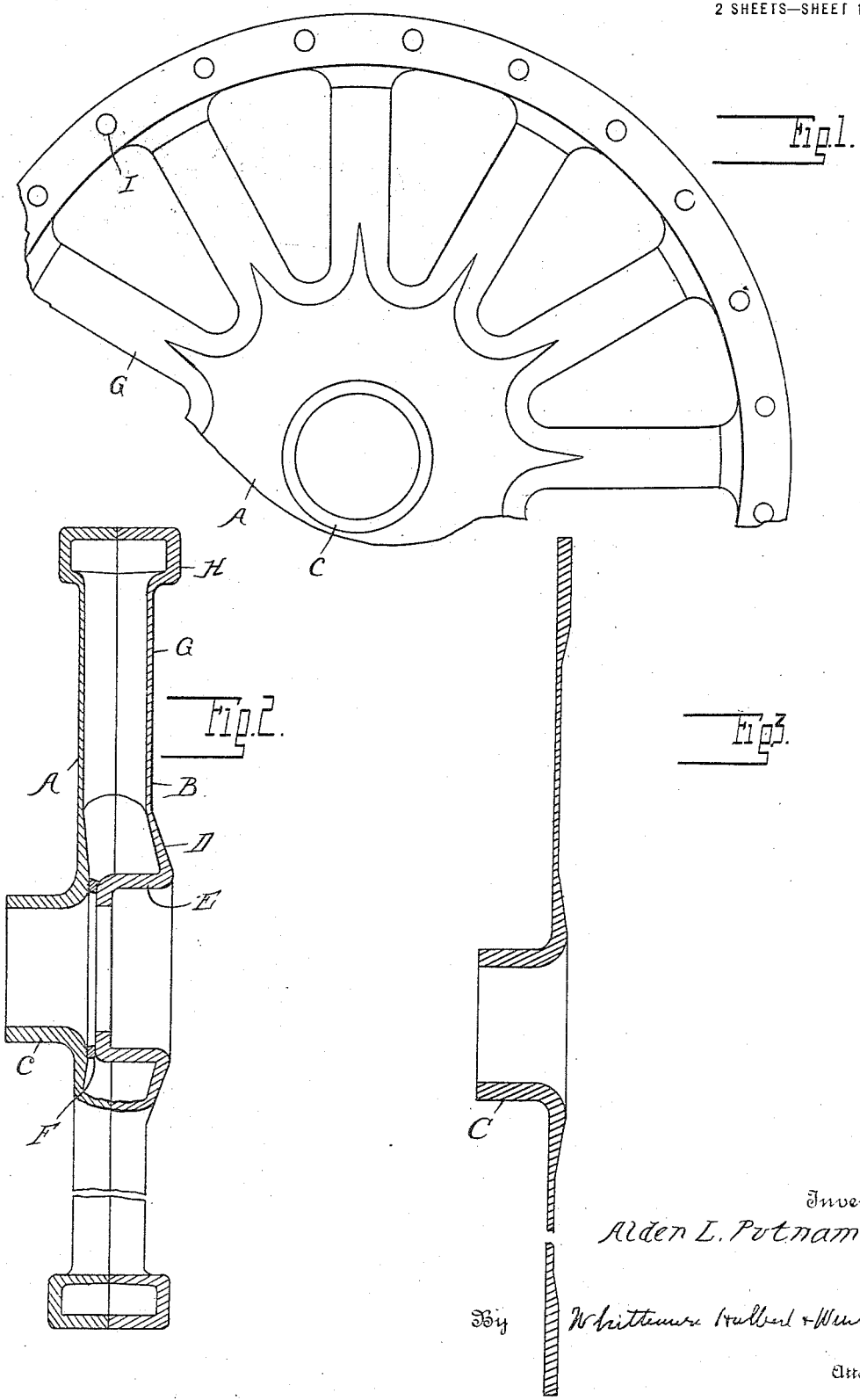
Inventor
Alden L. Putnam
By Whittemore Hulbert & Whittemore
Attorneys

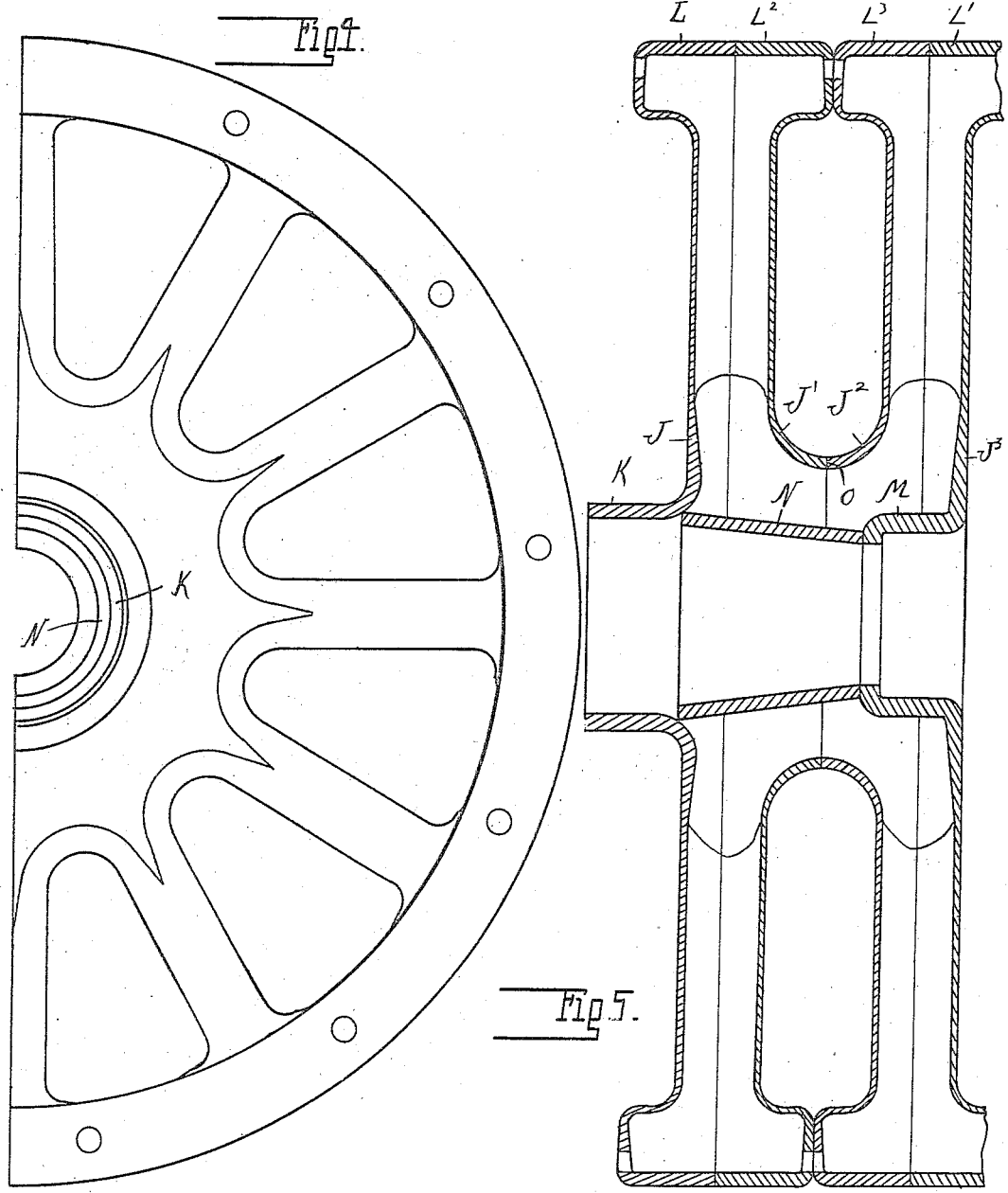

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

METALLIC WHEEL.

1,266,155. Specification of Letters Patent. Patented May 14, 1918.

Application filed August 23, 1915. Serial No. 46,919.

*To all whom it may concern:*

Be it known that I, ALDEN L. PUTNAM, a citizen of the United States of America, residing at Detroit, in the county of Wayne and State of Michigan, have invented certain new and useful Improvements in Metallic Wheels, of which the following is a specification, reference being had therein to the accompanying drawings.

The invention relates to metallic wheels for vehicles, and more particularly to the type designed for use with solid tires. It is the object of the invention to obtain a construction that may be formed from pressed sheet metal blanks, and which possesses the requisite strength in the different portions thereof without excessive weight in other portions.

In the drawings:

Figure 1 is a side elevation of a portion of the wheel;

Fig. 2 is a cross section thereof;

Fig. 3 is a cross section of the blank from which one of the wheel sections is formed; and Figs. 4 and 5 are views similar to Figs. 1 and 2 showing a modified construction.

My improvement is especially designed for use upon trucks and other vehicles carrying heavy loads. To secure the requisite strength the portion of the blank from which the hub is formed is of heavy gage metal, while the portion forming the spokes is thinned to be of considerably lighter gage. The rim or felly portion also requires increased strength and is therefore of a gage heavier than that of the spokes but lighter than that of the hub. Still further strength is imparted to this rim by fashioning it into a box cross section.

In detail, A and B are complementary pressed sheet metal sections abutting in the central plane of the wheel and secured to each other by suitable means such as welding. Each section comprises a hub portion, a spoke portion and a rim portion, the gage of the metal being proportioned to the strength required. The section A has its hub portion C of tubular form extending outward from the plane of the spokes. In the section B the hub portion D is first outwardly deflected from the plane of the spokes, and is then inwardly cupped at E to extend into proximity to the section C. The space between these sections is then bridged by a short tie member F, preferably welded to said sections.

The spokes G are of rounded cross section, the gage of the metal being relatively thin, but at the opposite ends of said spokes the gage of the metal is progressively thickened to produce a gradual change and to avoid weakness at any one spot.

The felly or rim is, as above stated, of a box section, and this is formed by first fashioning the felly portions of the sections A and B into channel cross sections H, the flanges of which abut and are welded or otherwise secured to each other. This forms a very strong structure and also one which is adapted to receive the solid tire, which is seated upon the outer flange of the box section. The sides of the box section are apertured at I for the passage of cross bolts, which secure the cheek plates or other attaching means for the tire. Thus the whole structure is one possessing rigidity and strength and at the same time is capable of being formed at relatively low cost.

The modified construction shown in Figs. 4 and 5 comprises a twin wheel formed from pressed sheet metal sections. Specifically this construction comprises four pressed sheet metal sections $J$ $J'$ $J^2$ $J^3$ which are united to each other in three planes. The section $J$ is formed with a tubular hub portion K of relatively heavy gage and a channel rim or felly portion L. The section $J^3$ is also formed with a hub portion M of relatively heavy gage, but this is inwardly cupped and is connected with the section K by a tubular tie member N. This section $J^3$ also has a channel felly portion L' similar to the portion L. The sections $J'$ and $J^2$ are each provided with channel felly portions $L^2$ and $L^3$ and with spoke portions, the inner ends of which spoke portions merge into tubular portions having their ends abutting and welded or otherwise secured to each other, as indicated at O. The whole structure constitutes a twin wheel having box girder felly portions for receiving the twin tires.

What I claim as my invention is:—

1. A twin wheel, comprising pairs of pressed sheet metal sections, the outer sections of each pair having hub portions of relatively heavy gage, and the inner members of the pairs being of lighter gage, and a connecting tie between said heavy gaged hub portions.

2. A twin wheel, composed of pressed sheet metal sections, the outer sections of each pair having hub portions of relatively heavy gage, and a connecting tie between said heavy gaged hub portions.

3. A twin wheel, comprising pairs of pressed sheet metal sections, the two inner sections having tubular rigidly connected hub portions, and means rigidly connecting the two outer sections extending through said tubular portions of the inner sections.

In testimony whereof I affix my signature in presence of two witnesses.

ALDEN L. PUTNAM.

Witnesses:
WM. J. BELKNAP,
JAMES P. BARRY.